United States Patent [19]

Drew et al.

[11] Patent Number: 5,093,138

[45] Date of Patent: Mar. 3, 1992

[54] GLYCERIN-CONTAINING FLOWABLE, PRESSURE-COMPENSATING MATERIAL AND PROCESS FOR PRODUCING SAME

[75] Inventors: Terrence M. Drew; Chris A. Hanson; Alden B. Hanson, all of Boulder, Colo.

[73] Assignee: Alden Laboratories, Inc., Boulder, Colo.

[21] Appl. No.: 573,452

[22] Filed: Aug. 27, 1990

Related U.S. Application Data

[63] Continuation-in-part of Ser. No. 410,610, Sep. 21, 1989, and Ser. No. 537,344, Jun. 13, 1990.

[51] Int. Cl.$^5$ .................. B32B 1/00; C09K 21/00; A61L 2/00
[52] U.S. Cl. ................................. 426/68; 106/672; 252/601; 422/1; 428/76
[58] Field of Search .................. 428/68, 76, 907, 921; 106/672; 252/601; 422/1

[56] References Cited

U.S. PATENT DOCUMENTS

| | | | |
|---|---|---|---|
| 2,885,360 | 5/1959 | Haden, Jr. et al. | 252/28 |
| 3,308,491 | 3/1967 | Spence | 5/450 |
| 3,402,411 | 9/1968 | Hanson | 12/142 |
| 3,449,844 | 6/1969 | Spence | 36/44 |
| 3,548,420 | 12/1970 | Spence | 623/37 |
| 3,635,849 | 1/1972 | Hanson | 128/595 |
| 3,663,973 | 5/1972 | Spence | 5/450 |
| 3,810,265 | 5/1974 | McGrew | 5/450 |
| 3,862,044 | 1/1975 | Christopher et al. | 252/8.55 |
| 4,019,209 | 4/1977 | Spence | 623/7 |
| 4,038,762 | 8/1977 | Swan, Jr. | 36/89 |
| 4,083,127 | 4/1978 | Hanson | 36/93 |
| 4,108,928 | 8/1978 | Swan, Jr. | 264/26 |
| 4,144,658 | 3/1979 | Swan, Jr. | 36/117 |
| 4,229,546 | 10/1980 | Swan, Jr. | 521/55 |
| 4,243,754 | 1/1981 | Swan, Jr. | 521/55 |
| 4,380,569 | 4/1983 | Shaw | 428/283 |
| 4,668,564 | 5/1987 | Orchard | 428/246 |
| 4,793,402 | 12/1988 | Yano et al. | 165/10 |

OTHER PUBLICATIONS

"Aqualon (TM) Cellulose Gum, Sodium Carboxymethylcellulose", Physical and Chemical Properties, Copyright 1988, Aqualon Co.

"Natrosol (TM), Hydroxyethylcellulose, A Non-Ionic Water-Soluble Polymer", Physical and Chemical Properties, Revised Jul. 1987, Aqualon Co.

Primary Examiner—William J. Van Balen
Attorney, Agent, or Firm—Sheridan, Ross & McIntosh

[57] ABSTRACT

A flowable, pressure-compensating composition is provided comprising a liquid, a material for increasing the viscosity of the liquid and spherical particles. A method for making such composition is also provided. The composition is especially suitable for use in padding devices.

76 Claims, No Drawings

GLYCERIN-CONTAINING FLOWABLE, PRESSURE-COMPENSATING MATERIAL AND PROCESS FOR PRODUCING SAME

This application is a continuation-in-part of U.S. patent application Ser. No. 07/410,610, filed Sept. 21, 1989 and of U.S. patent application Ser. No. 07/537,344, filed on June 13, 1990.

FIELD OF THE INVENTION

This invention relates generally to the field of padding materials, and in particular, to flowable, pressure-compensating materials and methods for producing such materials.

BACKGROUND OF THE INVENTION

Various padding devices have been employed in the past. Examples include liquid- or gas-filled bladders, e.g. water-filled cushions and pneumatic pads; and gases or liquids dispersed in a solid material, e.g. foams and gels. Generally, such padding devices operate on the principle of conformation to the shape of an object when placed under pressure. When a force, such as a person's mass, is placed on such a padding device, the device deforms so as to conform to the shape of the pressure applying object in order to distribute the force over as large an area as possible. These devices perform adequately when the object being padded has a relatively large, uniformly shaped surface area. However, when the object being padded includes a relatively small area of concentrated force, such as that caused by a protuberance, the majority of known padding devices do not perform to adequately reduce the discomfort of users in many applications. This is because such padding devices exert greater responsive pressure on the area of concentrated force.

The reason for the greater pressure is that materials employed in prior art padding devices typically have a high degree of "memory." As used herein, the term "memory" will refer to that characteristic of a material in which the material returns to its original shape as a result of internal restoring forces when an external force is removed. Such materials deform to the shape of an object which applies an external force by compressing. However, due to the internal restoring forces, a pressure which is proportional to the degree of compression is exerted against the object which applies the external force. A sharp protuberance compresses the padding device more than the surrounding areas and, as a result, the padding device presses back with greater pressure in these areas of high compression. Such areas of high pressure are especially undesirable when the protuberance is a bone, such as an ankle or ischial tuberosity. The high pressure can lead to discomfort and, after periods of extended use, to actual damage to the tissue overlying the protruding bone.

The problem can be described with reference to a padding device comprising a gas dispersed in a solid material, e.g. foam. Tiny gas bubbles in foam act like millions of coil "springs." When required to conform to an irregular shape, such as a human body, the "springs" are compressed to varying degrees, each pushing back on the body with a force proportional to the amount of compression. Intimate conformity is best obtained with a relatively soft foam, which can be compared to weak "springs." The pressure on protuberances, where the "springs" are greatly compressed, will be relatively high, possibly causing pain and reduced circulation. The problem is even more pronounced if a stiffer foam is employed, because the "springs" are stronger.

Deformable silicone gel padding devices are disclosed in U.S. Pat. No. 3,449,844 by Spence, issued June 17, 1969; U.S. Pat. No. 4,380,569 by Shaw, issued Apr. 19, 1983; U.S. Pat. No. 3,663,973 by Spence, issued May 23, 1972; U.S. Pat. No. 3,548,420 by Spence, issued Dec. 22, 1970; U.S. Pat. No. 3,308,491 by Spence, issued Mar. 14, 1967; U.S. Pat. No. 4,019,209 by Spence issued Apr. 26, 1977; and U.S. Pat. No. 4,668,564 by Orchard, issued May 26, 1987. In U.S. Pat. No. 4,380,569, a silicone gel containing glass microbeads is disclosed.

The silicone gel disclosed in these patents is described as having near total memory. In other words, it returns to its original shape when an external force is removed. The internal restoring forces necessary to provide such memory are undesirable in some applications. In use, differential pressures will result depending upon the degree of deformation of the silicone gel material, with higher deformation resulting in localized areas of high pressure being exerted on the external pressure applying object.

In order to alleviate the problem of differential pressure inherent with many prior art materials, flowable, pressure-compensating materials were developed. Such materials and applications thereof are described in U.S. Pat. No. 3,402,411 by Alden Hanson, issued Sept. 24, 1968; U.S. Pat. No. 3,635,849 by Alden Hanson, issued Jan. 18, 1972; U.S. Pat. No. 4,038,762 by Swan, Jr., issued Aug. 2, 1977; U.S. Pat. No. 4,083,127 by Chris Hanson, issued Apr. 11, 1978; U.S. Pat. No. 4,108,928 by Swan, Jr., issued Aug. 22, 1978; U.S. Pat. No. 4,144,658 by Swan, Jr., issued Mar. 20, 1979; U.S. Pat. No. 4,229,546 by Swan, Jr., issued Oct. 21, 1980; and U.S. Pat. No. 4,243,754 by Swan, Jr., issued Jan. 6, 1981. Each of these U.S. patents is incorporated herein by reference in its entirety. These patents will collectively be referred to as the "flowable, pressure-compensating material patents."

The preferred materials disclosed in U.S. Pat. No. 3,402,411 comprise from 20 to 25 weight percent polyisobutylene, from 25 to 37.5 weight percent of an inert oil, e.g. mineral oil or a saturated ester oil or a mixture thereof and from 42.5 to 50 weight percent inorganic filler. U.S. Pat. No. 3,635,849 discloses a composition consisting essentially of from about 5 to about 45 weight percent of a polyolefin, particularly polyisobutylene, from about 15 to about 70 weight percent of a paraffin and from about 5 to about 80 weight percent oil. Lightweight aggregate materials, for example, polystyrene beads or a heavy aggregate such as $Fe_3O_4$ can also be added.

The flowable, pressure-compensating materials disclosed in U.S. Pat. Nos. 4,038,762, 4,108,928 and 4,243,754 include from 21.39 to 77.96 weight percent oil, 21.04 to 69.62 weight percent wa>: and 1 to 9 weight percent microbeads. These patents teach away from the use of water in the finished product stating that "Since water generally increases the specific gravity of the finished fitting material, and does not serve any functional or necessary purpose, as such, in the finished fitting material, it is very desirable that if it is present in the finished fitting material, that it not be present in amounts or levels that exceed tolerable, minimal or residual levels (e.g. up to or not exceeding about 8% by weight, preferably up to not exceeding about 3% or about 5% by weight)."

U.S. Pat. Nos. 4,144,658 and 4,229,546 disclose flowable, pressure-compensating materials comprising 10 to 60 weight percent hollow, glass microbeads, 8.5 to 34 weight percent wax and 26.5 to 81 weight percent oil. U.S. Pat. No. 4,083,127 discloses a flowable, pressure-compensating fitting material consisting essentially of discrete, lightweight, sturdy microbeads distributed throughout a continuous phase of wax and oil.

In use, the flowable, pressure-compensating materials disclosed in the above-mentioned patents are typically placed in a pliable package, such as between two leak-proof resinous sheets which are sealed at the edges. The flowable materials act hydraulically. An applied force causes flowable material to migrate from areas of higher pressure to areas of lower pressure until pressure throughout the package is uniform. Once conformity has been achieved, force is distributed substantially equally over the entire surface of the package thus alleviating the differential pressure problems associated with prior devices. The viscosity of the flowable materials can be varied. Higher viscosity does not decrease the ability of the flowable materials to conform to the shape of the pressure applying object, only the rate at which they will migrate to conform. Flowable materials are presently marketed under the trademark FLOLITE ™ by Alden Laboratories, Inc. of Boulder, Colo. U.S.A.

FLOLITE ™ brand materials have performed exceptionally well in a number of applications, and have gained wide commercial acceptance in the marketplace. In spite of this commercial success, it would be advantageous to provide novel compositions which are useful as flowable, pressure-compensating materials. For example, it would be advantageous to provide a composition which exhibits a higher degree of flame retardancy than present flowable, pressure-compensating materials. It would be advantageous if the number of components required to provide a flowable, pressure-compensating composition were reduced to a minimum. In this way, it would be possible to simplify manufacturing. It would be advantageous if the materials used in a composition were relatively inexpensive in order to reduce raw material costs. It would be advantageous if the composition were to be less prone to separation than currently-employed materials. It would be advantageous if spherical particles included in a flowable, pressure-compensating composition would not "float out" of the composition. It would be advantageous if the viscosity of the composition was relatively stable over broad temperature ranges. It would be advantageous if the viscosity of the material could be controlled in such a way so as to ease manufacture of devices containing the composition.

SUMMARY OF THE INVENTION

In accordance with the present invention, a novel flowable, pressure-compensating composition is provided. The composition comprises a liquid, preferably containing glycerin, a material for increasing the viscosity of the liquid and substantially spherical particles dispersed throughout the composition.

As used herein, the term "glycerin" refers to the trihydric alcohol having the chemical formula $(CH_2OH)_2CHOH$, which is also commonly referred to as glycerol. Although glycerin is the preferred liquid for use in connection with the present invention, alternative liquids such as other glycerols (i.e., other trihydric alcohols) and glycols (i.e., dihydric alcohols) can also be employed. For the sake of simplicity, the following description of the invention will refer to glycerin as the preferred liquid, however, it is to be expressly understood that the other liquids can be used, even though glycerin is preferred. Glycerin has a hygroscopic nature and may comprise a small amount of water, e.g. about 4 percent. In certain instances, it is advantageous to include a minor amount of water in the liquid.

Preferably, the material for increasing the viscosity of the liquid is selected from the group consisting of guar, agar, carboxymethylcellulose, hydroxypropylcellulose, hydroxyethylcellulose, polyethyleneoxide, fumed silica, attapulgite clays and mixtures thereof. More preferably, the viscosity-increasing agent is an attapulgite clay. Preferably, the spherical particles are less than about 300 micrometers in diameter.

A process for producing the flowable, pressure-compensating compositions is also provided. The process includes the steps of preparing a slurry comprising a viscosity-increasing agent, a liquid and substantially spherical particles, and mixing the components together until the viscosity-increasing agent and the particles are distributed substantially evenly throughout the liquid. The liquid preferably includes between about 25 weight percent and about 75 weight percent glycerin based on the total composition weight.

Preferably, the flowable, pressure-compensating composition of the present invention is placed within an enclosure. In a preferred embodiment, the composition is placed between two resinous sheets, which are subsequently heat sealed together. In one embodiment of the invention, the composition is treated to kill microorganisms and prevent their growth. The composition may also include an additive, preferably boric oxide, to increase the flame retardance of the composition.

The present compositions provide a number of advantages. When flame retardant such as boric oxide ($B_2O_3$) is used in the composition, it typically has a higher degree of flame retardancy than prior art materials which are oil and/or wax based. Glycerin has the advantage of not only lowering the freezing point of the composition, but it also provides a "viscosity bonus effect", which is described in more detail hereinbelow, when used with certain viscosity-increasing materials. Further, the spherical particles dispersed throughout the composition are not prone to float to the top of the composition (a condition termed "float out"), in spite of being less dense than the remainder of the composition. Also, the viscosities of the present compositions are stable over broad temperature ranges. Furthermore, some of the present compositions can have initially low viscosities for limited periods of time to ease workability. This is advantageous when manufacturing padding devices because it allows the compositions to be poured into an enclosure which is then sealed. Subsequently, the viscosity of the composition increases to the desired level.

DETAILED DESCRIPTION OF THE INVENTION

In accordance with the present invention, a flowable, pressure-compensating composition and process for making the same is provided.

The composition includes liquid, preferably including a dihydric or trihydric alcohol and more preferably including glycerin, and a viscosity-increasing agent which has an affinity for the liquid. Spherical particles are dispersed throughout the composition. Additionally, flame retardants can be added and/or preservatives can be included to prevent microbiological attack and chemical degradation.

The process for producing the present composition generally involves mixing the liquid, viscosity-increasing agent and spherical particles until a homogenous mixture is achieved. The specific process for producing compositions in accordance with the present invention will vary slightly depending upon the liquid and viscosity-increasing agent employed. For example, one process is preferably employed when guar, agar, carboxymethylcellulose, hydroxypropylcellulose, hydroxyethylcellulose and/or polyethyleneoxide (hereinafter collectively referred to as "organic viscosity-increasing agents") are employed. A slightly different process is employed when fumed silica and/or attapulgite clays (hereinafter collectively referred to as "mineral viscosity-increasing agents") are employed.

When the organic viscosity-increasing agents are employed, the pH of the composition can be adjusted in order to control the rate in which the viscosity of the fluid increases, i.e. the "viscosity buildup" rate. Generally, if the pH is lowered, the viscosity buildup will proceed at a slower rate. A low pH is also advantageous when using certain preservatives in the composition.

The viscosity-increasing agent is a material which, when mixed with the liquid, increases the viscosity of the liquid. Preferred organic viscosity-increasing agents for use with the present composition include gums, cellulose-based materials and other polymers. Preferred viscosity-increasing agents of this type include guar, agar, hydroxyethylcellulose, carboxymethylcellulose, hydroxypropylcellulose and polyethyleneoxide. Preferably, the organic viscosity-increasing agent is present in an amount from about 0.5 weight percent to about 10 weight percent, and more preferably from about 1 weight percent: to about 6 weight percent, and most preferably from about 1.2 weight percent to about 4 weight percent, based on the total composition weight.

Hydroxyethylcellulose, carboxymethylcellulose and hydroxypropylcellulose, as well as other cellulose-based materials, are available from Aqualon Company of Wilmington, Del. Carboxymethylcellulose is described in a report entitled "Aqualon (TM) Cellulose Gum, Sodium Carboxylmethylcellulose, Physical and Chemical Properties" copyright 1988, available from Aqualon Company. Hydroxyethylcellulose is described in a report entitled "Natrosol (TM), Hydroxyethylcellulose, A Non-Ionic Water-Soluble Polymer, Physical and Chemical Properties," revised July, 1987, available from Aqualon Company. Both of these Aqualon publications are incorporated herein by reference in their entirety.

When using organic viscosity-increasing agents such as hydroxyethylcellulose, it is preferable that the organic material does not include a hydrolyzing retardant layer on its surface, as many commercially available brands do. A hydrolyzing retardant layer slows down the viscosity-increasing process. When glycerin is utilized in the composition, the process can become too slow to be practical.

The preferred liquids for use together with organic viscosity-increasing agents in the present composition include water and glycerin. An important advantage gained from the use of water is that it increases the flame retardancy of the composition. An important advantage gained from the use of glycerin is that it lowers the freezing point of the liquid. Additionally, another and important advantage gained from the use of glycerin is that it is much easier to contain within a resinous package, because glycerin is much less likely to evaporate through the resinous material than is water. An additional advantage gained from the use of glycerin with organic viscosity-increasing agent is that it provides a "viscosity bonus effect", described below. Preferably, the glycerin is present in an amount in the range of from about 42 weight percent to about 74 weight percent based on the total composition, more preferably in an amount from about 57 weight percent to about 69 weight percent of the total composition. Water is preferably present in an amount in the range from about 1 weight percent to about 8 weight percent based on the total composition, more preferably in an amount from about 2 weight percent to about 6 weight percent of the total composition.

The behavior of some viscosity-increasing agents, such as highly substituted carboxymethylcellulose, in mixed-solvent systems, such as glycerin-water, is similar to its behavior in water alone. However, in mixed systems, the viscosity of the solvent affects the viscosity of the solution. For example, if a 60:40 mixture of glycerin and water (which is 10 times as viscous as water alone) is used as the solvent, the resulting solution of well-dispersed carboxymethylcellulose will be ten times as viscous as the comparable solution in water alone. This behavior is commonly referred to as the "viscosity bonus effect."

The total liquid content in the organic viscosity-increasing agent composition is preferably in the range of from about 50 weight percent to about 76 weight percent based on the total composition weight, and is more preferably present in an amount from about 60 weight percent to about 70 weight percent.

The organic viscosity-increasing agent containing composition is preferably produced by initially mixing the organic viscosity-increasing agent and glycerin. This slurry can then be mixed with water and the remainder of the ingredients. Preferably the mixing is accomplished in a blender using an emulsifier or homogenization head. As will be appreciated by those skilled in the art, other mixing techniques can be employed.

In addition to organic viscosity-increasing agents, it is possible to use mineral viscosity-increasing agents. Preferred mineral viscosity-increasing agents include fumed silica, such as Cab-O-Sil M5 TM, available from the Cabot Corporation of Tusccla, Ill., and attapulgite clays, such as Attagell 40 TM or Attagell 50 TM, both available from the Englehard Corporation of Attapulgus, Ga. Advantages of using mineral viscosity-increasing agents include: the agents can be used with glycerin alone, without and, need to employ water; the composition can be sealed within a resinous package using heat-sealing techniques which provide good clean seals; and the materials, particularly attapulgite clays, are relatively inexpensive. The advantage of using glycerin alone, with no added water, is that you obtain a composition having a very low freezing point and in addition, it is much easier to contain glycerin within a resinous package. Additionally, it has been found that mineral viscosity-increasing agents, particularly attapulgite clay, have relatively stable viscosity characteristics over a wide range of temperatures and are not prone to separating during use.

The mineral viscosity-increasing agents are preferably present in an amount from about 2 weight percent to about 30 weight percent, based on the total composition weight. More preferably the mineral agents comprise from about 3 weight percent to about 20 weight percent of the total composition weight, and most preferably from about 4 weight percent to about 15 weight percent of the total composition weight. Glycerin employed in connection with the mineral viscosity-increasing agents is preferably present in an amount from about 25 weight percent to about 75 weight percent, and more preferably in an amount from about 50 weight percent to about 74 weight percent, based on the total composition weight. When fumed silica is employed, it is preferable to also employ a surfactant, e.g. Trithon X 100 TM.

When mixing the mineral viscosity-increasing agents with the glycerin, it is preferable to mix a portion of the glycerin with the mineral viscosity-increasing agents to form an initial slurry and then add the rest of the materials. The mixing can be accomplished using a blender with an emulsifier or an homogenization head. Alternatively, all of the materials may be mixed together at once.

All of the viscosity-increasing agents of the present invention have the important characteristic of increasing the viscosity of a fluid, while still permitting the fluid to flow. The typical composition of the present invention is flowable and does not have total memory. In other words, once deformed, it will not always return to its original shape. However, some compositions in accordance with the present invention can exhibit a small degree of gel strength. But the gel structure can be broken merely by applying sufficient force.

The compositions of the present invention are non-Newtonian, because their viscosities change when the shear rate changes. In other words, the ratio of shear rate (flow) to shear stress (force) is not constant. The compositions are typically either pseudoplastic or thixotropic. A pseudoplastic composition is one which appears to have a yield stress beyond which flow commences and increases sharply with increase in stress. In practice, the compositions exhibit flow at all shear stresses, although the ratio of flow to force increases negligibly until the force exceeds the apparent yield stress. The flow rate of a thixotropic substance increases with increasing duration of agitation as well as with increased shear stress. In other words, the flow rate is time dependent. When agitation is stopped, internal shear stress can exhibit hysteresis. Upon reagitation, generally less force is required to create a given flow than is required for the first agitation. The fact that the present materials flow more readily when higher shear stress is applied is advantageous in a number of applications.

The particles employed in the present invention are preferably spherical and hollow to lessen their density and lighten the overall weight of the flowable, pressure-compensating composition, or, if desired, can be solid or cellular. Expandable microbeads, as described in U.S. Pat. Nos. 4,243,754, 4,108,928, and 4,038,762 can also be employed.

The spherical particles may be made from a number of suitable materials including for example silica glass, saran polymer, phenolic resin and carbon. Detailed descriptions of suitable spherical particles can be found in the flowable, pressure-compensating material patents, described hereinabove and incorporated herein by reference in their entirety. Glass beads are preferred in certain applications because of their relatively low cost. When higher bead strength is desired, phenolic resin or carbon beads are preferred.

When used in compositions where a low total weight is desired, the spherical particles are preferably within the size range of from about 10 micrometers to about 300 micrometers in diameter. The density of spherical particles can be, for example, about 0.05 to about 0.70 grams per cubic centimeter. More particularly, glass spherical particles preferably have a density of from about 0.23 grams per cubic centimeter to about 0.37 grams per cubic centimeter and phenolic resin spherical particles preferably have a density of about 0.15 grams per cubic centimeter.

Specific examples of suitable spherical particles include "3M Glass Bubbles" available from 3M, St. Paul, Minn., and "Microballoons" available from Union Carbide Specialty Chemicals Division, Danbury, Conn.

The spherical particles are preferably present in an amount from about 0.01 to about 32 weight percent based on the total composition weight, and more preferably in an amount from about 15 to about 31 weight percent and still more preferably in amount from about 25 weight percent to about 30 weight percent. The spherical particles of the present composition perform at least two important functions. First, the size, shape and quantity of the spherical particles influence the flow characteristics of the composition. Therefore, a composition can be tailored to have the desired flow characteristics by selecting the appropriate size, shape and amount of particles. Second, because of particle-to-particle contact, the spherical particles can enhance the distribution of loads placed on flexible packages containing the present composition.

Another advantage of the spherical particles employed in the present invention is that they permit a degree of weight control. For example, in most applications, the composition should weigh as little as possible. In such instances, lightweight hollow particles are preferred, in order to lower the overall density of the composition. However, in some applications a heavier composition is desired. Examples of such applications would include weight belts to be strapped around parts of a person's body (e.g., wrist and ankle weights) and padding devices where it is desired that the device's own weight hold it firmly in place. When heavy compositions are desired, solid particles comprising dense materials are preferred. In such applications, particles greater than 300 micrometers in diameter can be used effectively.

When employed in padding devices, the flowable, pressure-compensating composition is generally enclosed within a flexible, protective enclosure with a predetermined volume of the composition retained therein. Preferably, the enclosure is formed of suitable flexible material and desirably is a pliable, thermoplastic, resinous film that can be heat-sealed after the composition is inserted therewithin. Because of their relatively low cost and desirable strength and flexibility characteristics, polyurethane and polyvinylchloride materials are preferred for use as the enclosure film.

The composition is initially distributed substantially uniformly throughout the confines of the enclosure, which is provided by sealing (e.g., heat sealing) the film along the marginal edges. If desired, one can choose to heat seal the protective enclosure for the composition, but leave a small vent opening and a small filling port, so that a predetermined volume of the flowable composition may be injected into the enclosure through the filling port, followed by heat sealing both the vent opening and the filling port. Alternatively, the composition may be placed on one sheet, a second sheet may be placed over the composition, and the outer edges sealed. As can be appreciated, internal sealing lines can also be formed to compartmentalize the composition within the enclosure.

One of the advantages to using mineral viscosity-increasing agents such as fumed silica or attapulgite clays as the viscosity-increasing agent, is that the sealability of the film package is improved. When using cellulose based materials as the viscosity-increasing agent, such as hydroxyethylcellulose, the composition may "plate-out" and contaminate the seal.

The desired final viscosity of the composition can be selected to suit a wide variety of applications. Some applications require high viscosity compositions and others require compositions of much lower viscosity. For use in padding devices, viscosities in the range of from about 30,000 centipoise to about 1,000,000 centipoise are preferred. When the viscosity exceeds 1,000,000 centipoise, the composition is often so viscous that separation and non-homogeneity result.

The viscosity of the present compositions is generally provided by hydrogen bonding between water and the viscosity-increasing agents. This hydrogen bonding is sufficient to keep the spherical particles dispersed throughout the composition. In prior art materials, such as a silicone gel disclosed in U.S. Pat. No. 4,380,569, cross-linking reactions were believed necessary to prevent the microbeads from floating out.

In a preferred embodiment of the present invention, steps are taken in order to prevent microbiological attack and chemical degradation of the present compositions. For example, radiation sterilization can be performed. Preferably, the composition is subjected to radiation such as x-ray radiation or gamma radiation in order to destroy microorganisms present in the composition. An advantage of radiation treatment is that it can be performed after the composition has been placed in a package, such as between pliable sheets of resinous material.

An alternative method useful in preventing microbiological attack is the use of a heat sterilization step. For example, a padding device comprising the present composition placed in a polyvinylchloride package can be heated to about 180° F. for more than about 30 minutes, preferably between about 30 and 45 minutes. Preferably, this method is employed in an autoclave having a nitrogen atmosphere.

Alternatively, preservatives can be added to the composition in order to prevent microbiological attack and chemical degradation. Examples of suitable preservatives include formaldehyde, methyl- and propylparabens, phenol, phenylmercuric salts, sodium benzoate, sodium propionate, sorbic acid and sorbates (sodium and potassium salts). Additionally, proprietary preservatives such as Busan llml, 85 available from Buckman Laboratory, Dowicide A and Dowicil 75, 200 available from Dow Chemical Company, Proxel GXL and CRL available from ICI Americas Inc., Mertac 35 and Tektamer 38 available from Merk/Calgon Corporation, Thimerosal available from Eli Lilly and Company and Vancide TH available from R. T. Vanderbilt Co., Inc. can be used.

In order to function properly, certain preservatives (e.g. benzoates and sorbates) require a low pH, i.e., acidic, environment. This can be achieved by adding an acid, e.g. citric acid to the composition. Citric and/or other desirable acid is added in an amount sufficient to lower the pH to a range of about pH 4 to about pH 6 and preferably about pH 4.5 to about pH 5.5. In certain instances, such as when silica glass particles are employed, the silica will raise the pH of the system. Therefore, more acid is generally necessary to achieve the desired pH range than for a composition not having silica particles. Preferably from about 0.1 weight percent to about 0.5 weight percent benzoate or sorbate is included in the present compositions based on the total composition weight.

Additionally, flame retardants such as boric oxide ($B_2O_3$), boric acid ($B(OH)_3$), borax ($Na_2B_4O_7 \cdot 10H_2O$) or mixtures thereof can be added to the composition. This is particularly advantageous since the use of glycerin tends to decrease the flame retardancy of the composition. Preferably, flame retardant is added in an amount from about 5 weight percent to about 15 weight percent based on the total composition, more preferably from about 7 weight percent to about 8 weight percent based on the total composition.

In accordance with the present invention, a process for producing the present composition is provided. A preferred embodiment of the process includes an initial step of producing two slurries. For example, a first slurry of a mineral viscosity-increasing agent and glycerin or a first slurry of organic viscosity-increasing agent and glycerin can be provided. A second slurry, comprising more liquid, e.g. glycerin and/or water, and the spherical particles, is then provided. Additives such as acid, preservatives and flame retardants can also be mixed with this second slurry. At the appropriate time, the two slurries are mixed together. Alternatively, all the components may be mixed together at one time. Mixing can take place in mechanical mixers such as blenders available from Lightnin and Waring. Alternatively, static mixers such as those available from Chemix and from Lightnin can be used.

As explained hereinbefore, it can be advantageous to lower the pH of the compositions to a range of about pH 4 to about pH 6. One reason for this is that the rate of viscosity buildup is slower at lower pH's for organic viscosity-increasing agents. This provides a greater amount of time for working with the composition before it fully sets up. For example, when the composition is placed in an enclosure, it is advantageous if the composition maintains a low viscosity for a period of time to allow its insertion into the enclosure. The viscosity buildup rate can also be slowed by using a low temperature liquid and/or by the use of chemical retarders. Alternatively, excess water can initially be employed to lower the viscosity. After the composition is placed in the enclosure, the excess water can be allowed to evaporate until the desired viscosity is attained.

EXAMPLES

Four compositions were prepared containing the following materials:

| Composition No. 1 | |
|---|---|
| Weight Percent | Material |
| 2.9 | Water |
| 0.1 | Bactericide (Vancide TH ™ available from Vanderbilt Co.) |
| 23.7 | Spherical particles (B-37 designation for Glass Bubbles available from 3M) |

| -continued | |
| --- | --- |
| 65.5 | Glycerin |
| 0.5 | Hydroxyethylcellulose (Natrasol TM available from Aqualon) |
| 4.9 | Borax |
| 2.4 | Boric Acid |

Composition No. 2

| Weight Percent | Material |
| --- | --- |
| 7.8 | Attapulgite Clay (Attagel 50 TM available from Englehard Corporation) |
| 64.9 | Glycerin |
| 19.5 | Spherical particles (B-37 designation for Glass Bubbles available from 3M) |
| 7.8 | Boric Oxide (B$_2$O$_3$) |

Composition No. 3

| Weight Percent | Material |
| --- | --- |
| 74.7 | Glycerin |
| 4.5 | Fumed Silica (Cab-O-Sil M5 TM available from Cabot Corporation) |
| 1.5 | Surfactant (Trithon X100 TM) |
| 19.4 | Spherical particles (B-37 designation for Glass Bubbles available from 3M) |

Composition No. 4

| Actual Weight (Pounds) | Material |
| --- | --- |
| 0.5 | Glycerin |
| 0.2 | Fumed Silica (Cab-O-Sil M5 TM available from Cabot Corporation) |
| 0.03 | Surfactant (Trithon X100 TM) |
| 0.04 | Borax |
| 0.02 | Boric Acid |
| 0.15 | Spherical particles (B-37 for Glass Bubbles from 3M) |

(Alternatively, 0.06 pounds Boric Oxide could be substituted for the Borax and Boric Acid).

All four compositions were individually placed within a polyurethane package. The materials prepared according to the above formulations exhibited good uniformity, low separation of materials after a length of time, and low freezing points. Additionally, compositions 2, 3 and 4 exhibited more uniform viscosity over a period of timedue to the fact that the glycerin was effectively maintained within a resinous package.

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. A flowable, pressure-compensating composition, comprising:
   a) a liquid comprising dihydric or trihydric alcohol;
   b) a material for increasing the viscosity of the liquid; and
   c) substantially spherical particles having a diameter less than about 300 micrometers;
wherein said liquid is present in an amount from about 25 weight percent to about 75 weight percent based on the total composition weight.

2. A pressure-compensating composition as recited in claim 1, wherein said material is a mineral viscosity-increasing material.

3. A pressure-compensating composition as recited in claim 1, wherein said material is present in an amount from about 2 weight percent to about 30 weight percent based on the total composition weight.

4. A pressure-compensating composition as recited in claim 2, wherein said mineral viscosity-increasing material is selected from the group consisting of fumed silica, attapulgite clays and mixtures thereof.

5. A pressure-compensating composition as recited in claim 1, further comprising a flame retardant.

6. A pressure-compensating composition as recited in claim 5, wherein said flame retardant is selected from the group consisting of boric oxide, boric acid, borax and mixtures thereof.

7. A pressure-compensating composition as recited in claim 5, wherein said flame retardant is present in an amount from about 5 weight percent to about 15 weight percent based on the total composition weight.

8. A pressure-compensating composition as recited in claim 1, further comprising an outer enclosure for containing said composition.

9. A pressure-compensating composition as recited in claim 8, wherein said outer enclosure is constructed of a material selected from the group consisting of polyvinyl- and polyurethane-based materials.

10. A pressure-compensating composition as recited in claim 8, wherein said outer enclosure is constructed of a polyvinylchloride material.

11. A pressure-compensating composition as recited in claim 8, wherein said outer enclosure is substantially non-flammable.

12. A pressure-compensating composition as recited in claim 1, comprising:
   a) glycerin in an amount from about 50 weight percent to about 74 weight percent based on the total composition weight;
   b) material for increasing the viscosity of said liquid in an amount from about 3 weight percent to about 20 weight percent based on the total composition weight; and
   c) substantially spherical particles in an amount from about 15 weight percent to about 31 weight percent based on the total composition weight.

13. A pressure-compensating composition as recited in claim 1 further comprising a preservative.

14. A pressure-compensating composition as recited in claim 1, further comprising acid, benzoate, and sorbate.

15. A pressure-compensating composition as recited in claim 1, wherein said composition has been treated with heat to kill microorganisms contained therein.

16. A pressure-compensating composition as recited in claim 1, wherein said composition has been subjected to radiation to kill microorganisms contained therein.

17. A pressure-compensating composition as recited in claim 15, wherein said composition has been subjected to heat of approximately 180° F. for between about 30 and about 45 minutes to kill microorganisms contained therein.

18. A flowable, pressure-compensating composition, comprising:
   a) glycerin in an amount from about 25 weight percent to about 75 weight percent based on the total composition;
   b) a mineral viscosity-increasing material selected from the group consisting of fumed silica and attapulgite clay in an amount from about 2 weight percent to about 30 weight percent based on the total composition; and c) a flame retardant in an amount from about 5 weight percent to about 15 weight percent based on the total composition weight.

19. A padding device comprising a flexible enclosure and a flowable, pressure-compensating composition substantially filling said enclosure, said flowable, pressure-compensating composition comprising:
   a) liquid comprising dihydric or trihydric alcohol being present in an amount from about 25 weight percent to about 75 weight percent based on the total composition weight;
   b) mineral viscosity-increasing material in an amount from about 2 weight percent to about 50 weight percent based on the total composition weight; and
   c) substantially spherical particles in an amount from about 15 weight percent to about 31 weight percent based on the total composition weight.

20. A padding device as recited in claim 19, wherein said pressure-compensating composition further comprises a flame retardant selected from the group consisting of boric oxide, borax and boric acid, in an amount from about 5 weight percent to about 15 weight percent based on the total composition weight.

21. A process for producing a flowable, pressure-compensating composition, comprising the steps of:
   a) preparing a first slurry comprising a liquid and a viscosity-increasing agent;
   b) preparing a second slurry comprising substantially spherical particles; and
   c) mixing said first slurry and said second slurry until said agent and said spherical particles are distributed throughout said liquid;
wherein said composition comprises between about 25 weight percent and about 75 weight percent dihydric or trihydric alcohol.

22. A process as recited in claim 21, wherein:
   a) the amount of said viscosity-increasing agent is in a range of from about 3 weight percent to about 20 weight percent based on the total composition weight; and
   b) the amount of said particles is in a range from about 0.1 weight percent to about 34 weight percent based on the total composition weight.

23. A process as recited in claim 21, wherein said particles have a size of less than about 300 micrometers.

24. A process as recited in claim 21, further comprising the step of adding acid.

25. A process as recited in claim 21, further comprising the step of adding a preservative.

26. A process as recited in claim 21, further comprising the step of sealing said pressure-compensating composition within an enclosure.

27. A process as recited in claim 26, wherein at least a portion of said enclosure is sealed by heat.

28. A process as recited in claim 26, wherein said enclosure comprises material selected from the group consisting of polyvinyl- and polyurethane-based materials.

29. A process as recited in claim 21, further comprising a step of treating said composition with heat to kill microorganisms contained within said composition.

30. A process as recited in claim 21, further comprising the step of treating said composition with radiation to kill microorganisms contained therein.

31. A process as recited in claim 21, further comprising the step of sterilizing said composition by exposing it to heat of at least about 180° F. for a period of time of at least about 30 minutes.

32. A process as recited in claim 21, wherein said substantially spherical particles have a density less than the density of said liquid.

33. A process as recited in claim 21, wherein said substantially spherical particles have a density greater than the density of said liquid.

34. A process as recited in claim 21, wherein said viscosity-increasing agent comprises a mineral vicosity-increasing agent.

35. A process as recited in claim 21, wherein said viscosity-increasing agent is selected from the group consisting of fumed silica and attapulgite clays.

36. A process as recited in claim 21, wherein said second slurry further comprises a flame retardant.

37. A process as recited in claim 36, wherein said flame retardant is selected from the group consisting of boric oxide, boric acid, borax and mixtures thereof.

38. A flowable, pressure-compensating composition, comprising:
   a) a liquid comprising water and dihydric or trihydric alcohol;
   b) a material for increasing the viscosity of said liquid;
   c) substantially spherical particles having a diameter of less than about 300 micrometers;
wherein said alcohol is present in an amount from about 42 weight percent to about 74 weight percent based on the total composition weight and said water is present in an amount from about 1 weight percent to about 8 weight percent based on the total composition weight.

39. A pressure-compensating composition as recited in claim 38, wherein said material is selected from the group consisting of gums, cellulose-based materials, soluble oxide polymers or mixtures thereof.

40. A pressure-compensating composition as recited in claim 38, wherein said material is selected from the group consisting of guar, agar, carboxymethylcellulose, hydroxypropylcellulose, hydroxyethylcellulose, polyethyleneoxide, and mixtures thereof.

41. A pressure-compensating composition as recited in claim 38, further comprising an outer enclosure for containing said composition.

42. A pressure-compensating composition as recited in claim 41, wherein said outer enclosure is constructed of a material selected from the group consisting of polyvinyl- and polyurethane based materials.

43. A pressure-compensating composition as recited in claim 41, wherein said outer enclosure is constructed of polyvinyl chloride material.

44. A pressure-compensating composition as recited in claim 41, wherein said outer enclosure is substantially non-flammable.

45. A pressure-compensating composition as recited in claim 38, wherein said water is present in an amount from about 2 weight percent to about 6 weight percent and said alcohol is glycerin present in an amount from about 57 weight percent to about 69 weight percent based on the total composition weight.

46. A pressure-compensating composition as recited in claim 38, further comprising a preservative.

47. A pressure-compensating composition as recited in claim 38, further comprising acid, benzoate and sorbate.

48. A pressure-compensating composition as recited in claim 38, wherein said composition has been heat treated to kill microorganisms contained therein.

49. A pressure-compensating composition as recited in claim 38, wherein said composition has been subjected to radiation to kill microorganisms contained therein.

50. A pressure-compensating composition as recited in claim 38, wherein said composition has been subjected to heat of approximately 180° F. for between about 30 and about 45 minutes to kill microorganisms contained therein.

51. A pressure-compensating composition as recited in claim 38, further comprising a flame retardant.

52. A pressure-compensating composition as recited in claim 51, wherein said flame retardant is selected from the group consisting of boric oxide, borax, boric acid and mixtures thereof.

53. A pressure-compensating composition as recited in claim 51, wherein said flame retardant is present in an amount from about 5 weight percent to about 15 weight percent based on the total composition weight.

54. A flowable, pressure-compensating composition, comprising:
   a) a liquid comprising water in an amount from about 1 weight percent to about 8 weight percent based on the total composition, and glycerin in an amount from about 42 weight percent to about 74 weight percent based on the total composition;
   b) a material selected from the group consisting of gums, cellulose-based materials, soluble oxide polymers or mixtures thereof, in an amount from about 0.5 weight percent to about 10 weight percent based on the total composition weight; and
   c) substantially spherical particles in an amount from about 15 weight percent to about 31 weight percent based on the total composition weight.

55. A padding device comprising a flexible enclosure and a flowable, pressure-compensating composition substantially filling said enclosure, said pressure-compensating composition comprising:
   a) a liquid comprising water in an amount from about 1 weight percent to about 8 weight percent, and dihydric or trihydric alcohol in an amount from about 42 weight percent to about 74 weight percent based on the total composition weight;
   b) a material selected from the group consisting of guar, agar, carboxymethylcellulose, hydroypropylcellulose, hydroxyethylcellulose, polyethyleneoxide, in an amount from about 0.5 weight percent to about 10 weight percent based on the total composition weight; and
   c) substantially spherically particles in an amount from about 15 weight percent to about 31 weight percent based on the total composition weight.

56. A padding device as recited in claim 55, wherein said pressure-compensating composition further comprises a flame retardant selected from the group consisting of boric oxide, borax, boric acid, and mixtures thereof in an amount from about 5 weight percent to about 15 weight percent based on the total composition weight.

57. A process for producing a flowable, pressure-compensating composition, comprising the steps of:
   a) preparing a first slurry comprising a liquid and a viscosity-increasing agent;
   b) preparing a second slurry comprising substantially spherical particles;
   c) mixing said first slurry and said second slurry until said agent and said spherical particles are distributed throughout said liquid;
wherein said second slurry comprises water in an amount from about 1 weight percent to about 8 weight percent and said first slurry comprises dihydric or trihydric alcohol.

58. A process as recited in claim 57, wherein:
   a) the amount of said viscosity-increasing agent is in a range from about 0.5 weight percent to about 10 weight percent based on the total composition weight; and
   b) the amount of said particles is in a range from about 0.1 weight percent to about 34 weight percent.

59. A process as recited in claim 57, wherein said particles have the size of less than about 300 micrometers.

60. A process as recited in claim 57, further comprising the step of adding acid.

61. A process as recited in claim 57, further comprising the step of adding a preservative.

62. A process as recited in claim 57, further comprising the step of sealing said pressure-compensating composition within an enclosure.

63. A process as recited in claim 62, wherein at least a portion of said enclosure is sealed by heat.

64. A process as recited in claim 62, wherein said enclosure comprises material selected from the group consisting of polyvinyl- and polyurethane-based materials.

65. A process as recited in claim 57, further comprising the step of treating said composition with radiation to kill microorganisms contained within said composition.

66. A process as recited in claim 57, further comprising the step of treating said composition with heat to kill microorganisms contained within said composition.

67. A process as recited in claim 66 wherein said step of treating said composition comprises exposing said composition to heat of at least 180° F. for a period of time of at least 30 minutes.

68. A process as recited in claim 57 wherein said substantially spherical particles have a density less than the density of said liquid.

69. A process as recited in claim 57, wherein said substantially spherical particles have a density greater than the density of said liquid.

70. A process as recited in claim 57, wherein said viscosity-increasing agent comprises a material selected from the group consisting of gums, cellulose-based materials, soluble oxide polymers and mixtures thereof.

71. A process as recited in claim 57, wherein said viscosity-increasing agent comprises a material selected from the group consisting of guar, agar, carboxymethylcellulose, hydroxypropylcellulose, hydroxyethylcellulose, polyethyleneoxide, and mixtures thereof.

72. A pressure-compensating composition as recited in claim 18, further comprising from about 0.1 weight percent to about 32 weight percent spherical particles based on the total composition weight.

73. A pressure-compensating composition as recited in claim 18, wherein said glycerin is present in an amount from about 50 weight percent to about 74 weight percent based on the total composition and said mineral viscosity-increasing material is present in an amount from about 4 weight percent to about 15 weight percent based on the total composition.

74. A pressure-compensating composition as recited in claim 18, further comprising a flexible enclosure for containing said pressure-compensating composition.

75. A flowable, pressure-compensating composition, comprising:

(a) a liquid comprising water in an amount from about 1 weight percent to about 8 weight percent based on the total composition, and glycerin in an amount from about 25 weight percent to about 75 weight percent based on the total composition;

(b) a material selected from the group consisting of gums, cellulose-based materials, soluble oxide, polymers or mixtures thereof, in an amount from about 0.5 weight percent to about 10 weight percent based on the total composition; and (c) a flame retardant in an amount from about 5 weight percent to about 15 weight percent based on the total composition weight.

76. A pressure-compensating composition as recited in claim 75, further comprising a flexible enclosure for containing said composition.

* * * * *

UNITED STATES PATENT AND TRADEMARK OFFICE
CERTIFICATE OF CORRECTION

PATENT NO. : 5,093,138
DATED : March 3, 1992
INVENTOR(S) : Drew et al.

It is certified that error appears in the above-identified patent and that said Letters Patent is hereby corrected as shown below:

Column 2, line 57, please delete "wa>:" and insert therefor -- wax --.

Signed and Sealed this

Twelfth Day of October, 1993

Attest:

BRUCE LEHMAN

Attesting Officer

Commissioner of Patents and Trademarks